(12) United States Patent
Zhao et al.

(10) Patent No.: US 9,913,243 B2
(45) Date of Patent: Mar. 6, 2018

(54) POSITIONING METHOD AND ELECTRONIC DEVICE

(71) Applicant: Huawei Technologies Co., Ltd., Shenzhen (CN)

(72) Inventors: Qingwei Zhao, Shenzhen (CN); Qifeng Ma, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/463,014

(22) Filed: Mar. 20, 2017

(65) Prior Publication Data

US 2017/0195985 A1    Jul. 6, 2017

Related U.S. Application Data

(63) Continuation of application No. PCT/CN2015/086938, filed on Aug. 14, 2015.

(30) Foreign Application Priority Data

Sep. 25, 2014  (CN) .......................... 2014 1 0499303

(51) Int. Cl.
*H04W 36/00* (2009.01)
*H04W 64/00* (2009.01)
(Continued)

(52) U.S. Cl.
CPC .......... *H04W 64/003* (2013.01); *G01C 21/08* (2013.01); *G01S 5/0263* (2013.01); *H04W 24/02* (2013.01)

(58) Field of Classification Search
CPC ... H04L 63/08; H04L 67/104; H04L 2209/80; H04L 63/0407; H04L 63/061;
(Continued)

(56) References Cited

U.S. PATENT DOCUMENTS

2012/0158297 A1    6/2012  Kim et al.

FOREIGN PATENT DOCUMENTS

CN    101354253 A    1/2009
CN    102547572 A    7/2012
(Continued)

OTHER PUBLICATIONS

Cruz, O., et al., "3D Indoor Location and Navigation System Based on Bluetooth," 21st International conference on Electrical Communications and Computers, Feb. 28, 2011, 7 pages.
(Continued)

*Primary Examiner* — Nimesh Patel
(74) *Attorney, Agent, or Firm* — Conley Rose, P.C.

(57) ABSTRACT

A positioning method includes: obtaining a cell identity of a to-be-positioned terminal; determining at least one neighboring terminal of the to-be-positioned terminal according to the cell identity of the to-be-positioned terminal, where a cell identity of each neighboring terminal of the at least one neighboring terminal is the same as the cell identity of the to-be-positioned terminal; obtaining geomagnetic information of a location of each neighboring terminal of the at least one neighboring terminal and geomagnetic information of a location of the to-be-positioned terminal, to generate a geomagnetic information group of the to-be-positioned terminal; and obtaining, geographic location information of the to-be-positioned terminal.

15 Claims, 8 Drawing Sheets

(51) Int. Cl.
*H04W 24/02* (2009.01)
*G01S 5/02* (2010.01)
*G01C 21/08* (2006.01)

(58) Field of Classification Search
CPC . H04L 63/123; H04L 63/164; H04L 2209/24; H04L 2209/76; H04L 2463/101; H04L 63/1408; H04L 9/083; H04L 9/3263; H04L 61/1511; H04M 2250/12; H04M 1/72572; H04M 2250/64; H04M 1/04; H04M 1/6091; H04M 1/72527; H04M 1/6066; H04M 1/725; H04M 1/72519; H04M 2242/30; H04M 2250/04; H04M 3/567; G01C 17/00; G01C 21/08; G01C 17/02; H04W 74/0833; H04W 72/0413; H04W 52/245; H04W 56/005; H04W 72/0473; H04W 74/004; H04W 74/08; H04W 84/047; H04W 88/02; H04W 88/08; H04W 36/0066; H04W 36/0072; H04W 72/04; H04W 72/0453; H04W 16/32

See application file for complete search history.

(56) References Cited

FOREIGN PATENT DOCUMENTS

| CN | 103067861 A | 4/2013 |
|---|---|---|
| CN | 103363988 A | 10/2013 |
| CN | 103634900 A | 3/2014 |
| CN | 104020447 A | 9/2014 |
| WO | 2008120149 A1 | 10/2008 |

OTHER PUBLICATIONS

Zhang, C., et al., "Poster Abstract: MaWi: A Hybrid Magnetic and Wi-Fi System for Scalable Indoor Localization," XP32613197, 2014, pp. 275-276.

Foreign Communication From a Counterpart Application, European Application No. 15844279.8, Extended European Search Report dated Jul. 21, 2017, 8 pages.

Machine Translation and Abstract of Chinese Publication No. CN101354253, Jan. 28, 2009, 8 pages.

Machine Translation and Abstract of Chinese Publication No. CN103067861, Apr. 24, 2013, 7 pages.

Machine Translation and Abstract of Chinese Publication No. CN103363988, Oct. 23, 2013, 10 pages.

Machine Translation and Abstract of Chinese Publication No. CN104020447, Sep. 3, 2014, 10 pages.

Wen-Yuan, L., et al., "Multidimensional Fingerprints Method for Indoor Mobile Trajectory Mapping with Geomagnetic Information," vol. 35, No. 10, Oct. 2013, 6 pages.

English Translation of Wen-Yuan, L., et al., "Multidimensional Fingerprints Method for Indoor Mobile Trajectory Mapping with Geomagnetic Information," vol. 35, No. 10, Oct. 2013, 10 pages.

Foreign Communication From a Counterpart Application, PCT Application No. PCT/CN2015/086938, English Translation of International Search Report dated Nov. 25, 2015, 2 pages.

Foreign Communication From a Counterpart Application, PCT Application No. PCT/CN2015/086938, English Translation of Written Opinion dated Nov. 25, 2015, 6 pages.

POSITIONING METHOD AND ELECTRONIC DEVICE

CROSS-REFERENCE TO RELATED APPLICATIONS

This application is a continuation application of international patent application number PCT/CN2015/086938, filed on Aug. 14, 2015, which claims priority to Chinese patent application number 201410499303.2, filed on Sep. 25, 2014, which are incorporated by reference.

TECHNICAL FIELD

The present disclosure relates to the field of communications technologies, and in particular, to a positioning method and an electronic device.

BACKGROUND

Positioning services have developed into an important public service in people's daily life, and a core technology of the positioning services is a positioning technology.

Current mainstream positioning technologies include: a Global Positioning System (GPS) technology using a positioning satellite for positioning, a cell identity (ID) positioning technology determining a location of a to-be-positioned terminal by obtaining a cell ID of the location of the to-be-positioned terminal, and a positioning technology using an active signal device for positioning, such as WiFi or Bluetooth.

In addition, there is also a geomagnetic positioning technology, and a theoretical basis of the geomagnetic positioning technology is that: geomagnetic filed strength of any place on the Earth is different, and the geomagnetic filed strength corresponds to a latitude and a longitude in a one-to-one manner, so that as long as geomagnetic field strength of a location of a to-be-positioned terminal is measured, positioning can be implemented.

However, the GPS technology and the positioning technology using the active signal device depend heavily on a signal source. When a signal is not good or not stable, interruption occurs, and as a result, a continuous and stable positioning service cannot be provided. Although the cell ID positioning technology is stable, positioning precision is low, and only the positioning precision in a cell range can be provided. In addition, because surface configuration interferes with geomagnetic information, a case that multiple places have close or same geomagnetic information may occur. As a result, positioning accuracy of the geomagnetic positioning technology is relatively low.

That is, there is a technical problem in an existing positioning technology that positioning stability, positioning precision, and positioning accuracy cannot be achieved simultaneously.

SUMMARY

The present disclosure provides a positioning method, to resolve a technical problem in an existing positioning technology that positioning stability, positioning precision, and positioning accuracy cannot be achieved simultaneously.

According to a first aspect, a positioning method is provided, including: obtaining a cell identity of a to-be-positioned terminal; determining at least one neighboring terminal of the to-be-positioned terminal according to the cell identity of the to-be-positioned terminal, where a cell identity of each neighboring terminal of the at least one neighboring terminal is the same as the cell identity of the to-be-positioned terminal; obtaining geomagnetic information of a location of each neighboring terminal of the at least one neighboring terminal and geomagnetic information of a location of the to-be-positioned terminal, to generate a geomagnetic information group of the to-be-positioned terminal; and obtaining, according to the geomagnetic information group of the to-be-positioned terminal, geographic location information of the to-be-positioned terminal.

With reference to the first aspect, in a first possible implementation manner, the obtaining, according to the geomagnetic information group of the to-be-positioned terminal, geographic location information of the to-be-positioned terminal includes: sending the geomagnetic information group of the to-be-positioned terminal to a positioning server; and receiving the geographic location information of the to-be-positioned terminal returned based on the geomagnetic information group of the to-be-positioned terminal by the positioning server.

With reference to the first aspect, in a second possible implementation manner, the obtaining, according to the geomagnetic information group of the to-be-positioned terminal, geographic location information of the to-be-positioned terminal includes: sending the cell identity of the to-be-positioned terminal to a positioning server; receiving a location information set that is returned by the positioning server and that corresponds to the cell identity of the to-be-positioned terminal, where the location information set includes: at least one geomagnetic information group and at least one piece of geographic location information corresponding to the at least one geomagnetic information group; determining, from the at least one geomagnetic information group, a matching geomagnetic information group matching the geomagnetic information group of the to-be-positioned terminal; and determining, from the at least one piece of geographic location information, geographic location information corresponding to the matching geomagnetic information group as the geographic location information of the to-be-positioned terminal.

With reference to the first aspect, in a third possible implementation manner, the obtaining, according to the geomagnetic information group of the to-be-positioned terminal, geographic location information of the to-be-positioned terminal includes: sending the cell identity of the to-be-positioned terminal and the geomagnetic information group of the to-be-positioned terminal to a positioning server; receiving geographic location information that is returned by the positioning server and that corresponds to a matching geomagnetic information group matching the geomagnetic information group of the to-be-positioned terminal; and determining, from the at least one piece of geographic location information, the geographic location information corresponding to the matching geomagnetic information group as the geographic location information of the to-be-positioned terminal.

With reference to any one of the first aspect or the first possible implementation manner to the third possible implementation manner of the first aspect, in a fourth possible implementation manner, the determining at least one neighboring terminal of the to-be-positioned terminal according to the cell identity of the to-be-positioned terminal includes: determining at least one candidate neighboring terminal according to the cell identity of the to-be-positioned terminal, where the at least one candidate neighboring terminal includes a candidate neighboring terminal whose cell identity is the same as the cell identity of the to-be-positioned terminal; obtaining context information of each candidate neighboring terminal of the at least one candidate neighboring terminal and context information of the to-be-positioned terminal; and determining, from the at least one candidate neighboring terminal, a candidate neighboring terminal whose context information matches the context information of the to-be-positioned terminal, to form the at least one neighboring terminal of the to-be-positioned terminal.

With reference to the first aspect or the fourth possible implementation manner of the first aspect, in a fifth possible implementation manner, the context information is one or a combination of multiple of a WiFi identifier, a Bluetooth identifier, or a GPS parameter.

With reference to the first aspect, in a sixth possible implementation manner, the obtaining geomagnetic information of a location of each neighboring terminal of the at least one neighboring terminal and geomagnetic information of a location of the to-be-positioned terminal, to generate a geomagnetic information group of the to-be-positioned terminal includes: obtaining the geomagnetic information of the location of each neighboring terminal of the at least one neighboring terminal and the geomagnetic information of the location of the to-be-positioned terminal, to form a pre geomagnetic information group; and determining geomagnetic information from the pre geomagnetic information group, to form the geomagnetic information group of the to-be-positioned terminal, where a difference between a vertical component value of the determined geomagnetic information from the pre geomagnetic information group and a vertical component value of the geomagnetic information of the location of the to-be-positioned terminal is less than a preset threshold.

With reference to the first aspect, in a seventh possible implementation manner, after the obtaining, according to the geomagnetic information group of the to-be-positioned terminal, geographic location information of the to-be-positioned terminal, the method further includes: obtaining positioning precision of the geographic location information of the to-be-positioned terminal; determining whether the positioning precision meets a preset precision requirement; when the positioning precision does not meet the preset precision requirement, displaying a set positioning map; detecting a determining operation that is triggered to determine a positioning point on the positioning map; and based on the determining operation, obtaining information about a precise geographic location of the positioning point as the geographic location information of the to-be-positioned terminal.

According to a second aspect, a positioning method is provided, including: receiving a geomagnetic information group sent by a to-be-positioned terminal, where the geomagnetic information group includes geomagnetic information of a location of a neighboring terminal and geomagnetic information of a location of the to-be-positioned terminal, and the neighboring terminal is a terminal whose cell identity is the same as a cell identity of the to-be-positioned terminal; determining, according to the geomagnetic information group, geographic location information corresponding to the geomagnetic information group; and sending the geographic location information to the to-be-positioned terminal.

According to a third aspect, a positioning method is provided, including: receiving a cell identity sent by a to-be-positioned terminal; determining, from a pre-stored geomagnetic database according to the cell identity, a location information set corresponding to the cell identity, where the location information set includes: at least one geomagnetic information group and at least one piece of geographic location information corresponding to the at least one geomagnetic information group; and sending the location information set to the to-be-positioned terminal.

According to a fourth aspect, a positioning method is provided, including: receiving a cell identity and a geomagnetic information group of a to-be-positioned terminal that are sent by the to-be-positioned terminal; determining, from a pre-stored geomagnetic database according to the cell identity, a location information set corresponding to the cell identity, where the location information set includes: at least one geomagnetic information group and at least one piece of geographic location information corresponding to the at least one geomagnetic information group; determining, from the at least one geomagnetic information group, a matching geomagnetic information group matching the geomagnetic information group of the to-be-positioned terminal; determining, from the at least one piece of geographic location information, geographic location information corresponding to the matching geomagnetic information group; and sending the geographic location information corresponding to the matching geomagnetic information group to the to-be-positioned terminal.

According to a fifth aspect, an electronic device is provided, including: a processor configured to: obtain a cell identity of a to-be-positioned terminal; and determine at least one neighboring terminal of the to-be-positioned terminal according to the cell identity of the to-be-positioned terminal, where a cell identity of each neighboring terminal of the at least one neighboring terminal is the same as the cell identity of the to-be-positioned terminal; and a transceiver configured to: obtain geomagnetic information of a location of each neighboring terminal of the at least one neighboring terminal determined by the processor and geomagnetic information of a location of the to-be-positioned terminal, to generate a geomagnetic information group of the to-be-positioned terminal; and obtain, according to the geomagnetic information group of the to-be-positioned terminal, geographic location information of the to-be-positioned terminal.

With reference to the fifth aspect, in a first possible implementation manner, the transceiver is further configured to: send the geomagnetic information group of the to-be-positioned terminal to a positioning server; and receive the geographic location information of the to-be-positioned terminal returned by the positioning server based on the geomagnetic information group of the to-be-positioned terminal.

With reference to the fifth aspect, in a second possible implementation manner, the transceiver is further configured to: send the cell identity of the to-be-positioned terminal to a positioning server, and receive a location information set that is returned by the positioning server and that corresponds to the cell identity of the to-be-positioned terminal, where the location information set includes: at least one geomagnetic information group and at least one piece of geographic location information corresponding to the at least one geomagnetic information group; and the processor is further configured to: determine, from the at least one geomagnetic information group, a matching geomagnetic information group matching the geomagnetic information group of the to-be-positioned terminal; and determine, from the at least one piece of geographic location information, geographic location information corresponding to the matching geomagnetic information group as the geographic location information of the to-be-positioned terminal.

With reference to the fifth aspect, in a third possible implementation manner, the transceiver is further configured to: send the cell identity of the to-be-positioned terminal and the geomagnetic information group of the to-be-positioned terminal to a positioning server, and receive geographic location information that is returned by the positioning server and that corresponds to a matching geomagnetic information group matching the geomagnetic information group of the to-be-positioned terminal; and the processor is further configured to determine the geographic location information corresponding to the matching geomagnetic information group as the geographic location information of the to-be-positioned terminal.

With reference to any one of the fifth aspect, or the first possible implementation manner of the fifth aspect to the third possible implementation of the fifth aspect, in a fourth possible implementation manner, the processor is further configured to: determine at least one candidate neighboring terminal according to the cell identity of the to-be-positioned terminal, where the at least one candidate neighboring terminal includes a candidate neighboring terminal whose cell identity is the same as the cell identity of the to-be-positioned terminal; obtain context information of each candidate neighboring terminal of the at least one candidate neighboring terminal and context information of the to-be-positioned terminal; and determine, from the at least one candidate neighboring terminal, a candidate neighboring terminal whose context information matches the context information of the to-be-positioned terminal, to form the at least one neighboring terminal of the to-be-positioned terminal.

With reference to the fifth aspect or the fourth possible implementation manner of the fifth aspect, in a fifth possible implementation manner, the context information is one or a combination of multiple of a WiFi identifier, a Bluetooth identifier, or a GPS parameter.

With reference to the fifth aspect, in a sixth possible implementation manner, the transceiver is further configured to: obtain geomagnetic information of a location of each neighboring terminal of the at least one neighboring terminal and the geomagnetic information of the location of the to-be-positioned terminal, to form a pre geomagnetic information group, and send the pre geomagnetic information group to the processor; and the processor is further configured to receive the pre geomagnetic information group sent by the transceiver, and determine geomagnetic information from the pre geomagnetic information group, to form the geomagnetic information group of the to-be-positioned terminal, where a difference between a vertical component value of the determined geomagnetic information from the pre geomagnetic information group and a vertical component value of the geomagnetic information of the location of the to-be-positioned terminal is less than a preset threshold.

With reference to the fifth aspect, in a seventh possible implementation manner, the processor is further configured to: obtain positioning precision of the geographic location information of the to-be-positioned terminal; determine whether the positioning precision meets a preset precision requirement; and when the positioning precision does not meet the preset precision requirement, control to display a set positioning map; and after detecting a determining operation that is triggered to determine a positioning point on the positioning map, based on the determining operation, obtain information about a precise geographic location of the positioning point as the geographic location information of the to-be-positioned terminal.

According to a sixth aspect, a positioning server is provided, including: a transceiver configured to: receive a geomagnetic information group sent by a to-be-positioned terminal, and send the geomagnetic information group to a processor, where the geomagnetic information group includes geomagnetic information of a location of a neighboring terminal and geomagnetic information of a location of the to-be-positioned terminal, where the neighboring terminal is a terminal whose cell identity is the same as a cell identity of the to-be-positioned terminal; and the processor configured to determine, according to the geomagnetic information group sent by the transceiver, geographic location information corresponding to the geomagnetic information group, and control the transceiver to send the geographic location information to the to-be-positioned terminal.

According to a seventh aspect, a positioning server is provided, including: a transceiver configured to: receive a cell identity sent by a to-be-positioned terminal, and send the cell identity to a processor; and the processor configured to: determine, from a pre-stored geomagnetic database according to the cell identity sent by the transceiver, a location information set corresponding to the cell identity, where the location information set includes at least one geomagnetic information group and at least one piece of geographic location information corresponding to the at least one geomagnetic information group; and control the transceiver to send the location information set to the to-be-positioned terminal.

According to an eighth aspect, a positioning server is provided, including: a transceiver configured to: receive a cell identity and a geomagnetic information group of a to-be-positioned terminal that are sent by the to-be-positioned terminal; and send the cell identity and the geomagnetic information group of the to-be-positioned terminal to a processor; and the processor configured to: determine, from a pre-stored geomagnetic database according to the cell identity, a location information set corresponding to the cell identity, where the location information set includes at least one geomagnetic information group and at least one piece of geographic location information corresponding to the at least one geomagnetic information group; determine, from the at least one geomagnetic information group, a matching geomagnetic information group matching the geomagnetic information group of the to-be-positioned terminal; determine, from the at least one piece of geographic location information, geographic location information corresponding to the matching geomagnetic information group; and control the transceiver to send the geographic location information corresponding to the matching geomagnetic information group to the to-be-positioned terminal.

In the embodiments of the present disclosure, according to a highly stable cell ID positioning technology, a neighboring terminal whose cell identity is the same as a target cell identity of a to-be-positioned terminal is determined, geomagnetic information of a location of the neighboring terminal and target geomagnetic information of a location of the to-be-positioned terminal are used as a geomagnetic information group, to position geographic location information by using a geomagnetic positioning technology, which not only keeps stability of the CELL ID positioning technology, but also improves positioning precision by means of hierarchical positioning.

BRIEF DESCRIPTION OF DRAWINGS

To describe the technical solutions in the embodiments of the present disclosure, the following briefly describes the accompanying drawings required for describing the embodiments. The accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
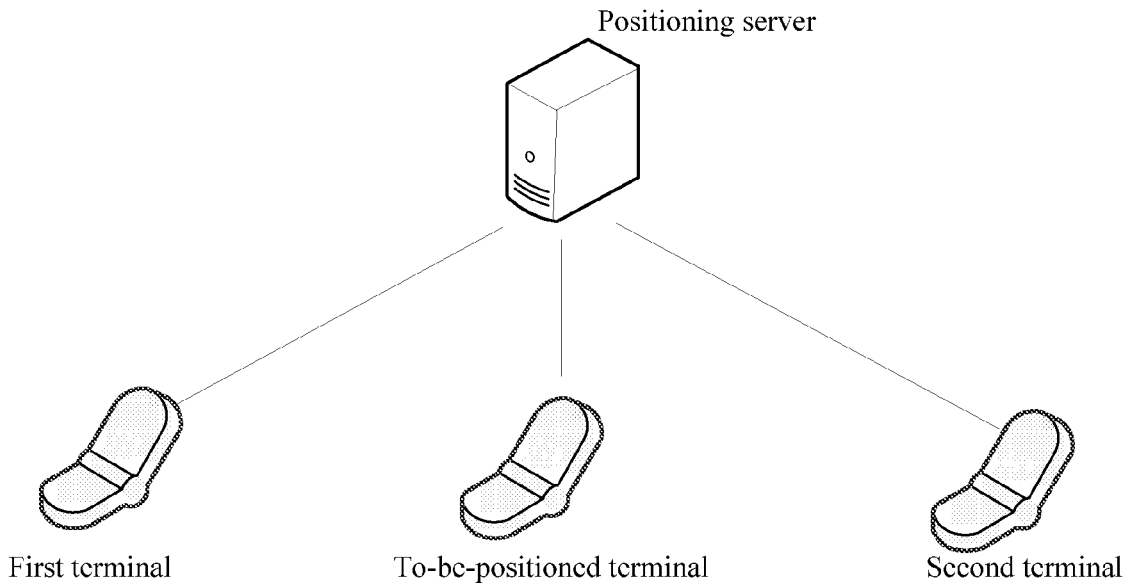
FIG. 1 is a schematic diagram of a system corresponding to a positioning method according to an embodiment of the present disclosure.

Before the embodiments of the present disclosure are introduced, a system corresponding to a positioning method in the embodiments of the present disclosure is introduced first. As shown in FIG. 1, FIG. 1 is a system used to implement the positioning method in the present disclosure, and the system includes: a positioning server, a to-be-positioned terminal, and multiple nearby terminals (for example: a first terminal, a second terminal, and a third terminal, where only two terminals are shown in FIG. 1). The system may be specifically a communication system based on Universal Mobile Telecommunications Service (UMTS), or may be a communication system based on Global System for Mobile Communications (GSM), or may be a communication system based on Long-Term Evolution (LTE), or may be a communication system based on code division multiple access (CDMA), or may be based on time division synchronous code division multiple access (TD-SCDMA), or the like, which is not limited in this application.

Embodiment 1

Figure 2:
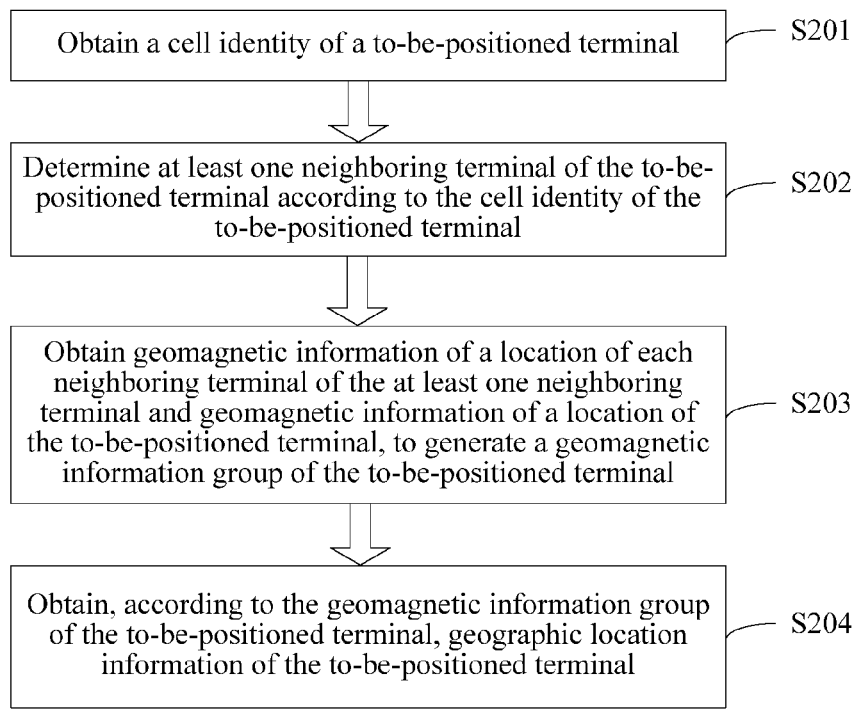
FIG. 2 is a flowchart of a positioning method according to an embodiment of the present disclosure.

This embodiment provides a positioning method. As shown in FIG. 2, the positioning method includes:

Step S201: Obtain a cell identity of a to-be-positioned terminal.

Step S202: Determine at least one neighboring terminal of the to-be-positioned terminal according to the cell identity of the to-be-positioned terminal, where a cell identity of each neighboring terminal of the at least one neighboring terminal is the same as the cell identity of the to-be-positioned terminal.

Step S203: Obtain geomagnetic information of a location of each neighboring terminal of the at least one neighboring terminal and geomagnetic information of a location of the to-be-positioned terminal, to generate a geomagnetic information group of the to-be-positioned terminal.

Step S204: Obtain, according to the geomagnetic information group of the to-be-positioned terminal, geographic location information of the to-be-positioned terminal.

In a specific implementation process, the positioning method provided in this embodiment may be applied to a terminal such as a mobile phone, a tablet computer or a smart watch, or may be applied to a positioning server, which is not limited in this embodiment.

In a specific implementation process, according to different manners of obtaining geographic location information, the positioning method provided in this embodiment may include two cases: primary positioning and secondary positioning. Descriptions are separately provided below by using an example in which the positioning method is applied to a to-be-positioned terminal.

The primary positioning is introduced first.

That is, an area matching the geomagnetic information group of the to-be-positioned terminal is determined in an actually measured geomagnetic information image, and the geographic location information is obtained according to a terrestrial coordinate system. Specific implementation steps are as follows:

First, step S201 of obtaining a cell ID of a to-be-positioned terminal is performed.

In a specific implementation process, when a user opens a positioning application and performs a positioning trigger operation, after receiving the operation, the to-be-positioned terminal may be triggered to obtain the cell ID of the to-be-positioned terminal, or after receiving a positioning instruction sent by another device, the to-be-positioned terminal may be triggered to obtain the cell ID of the to-be-positioned terminal, which is not limited in this embodiment.

Specifically, for a manner of obtaining the cell ID of the to-be-positioned terminal, for example, an Android operating system is installed on the to-be-positioned terminal, the to-be-positioned terminal may invoke a CellLocation interface to communicate with a server, a base station, or a radio network controller (RNC), so as to obtain the cell ID.

In step S201, after the cell ID of the to-be-positioned terminal is obtained, step S202 of determining at least one neighboring terminal of the to-be-positioned terminal according to the cell ID of the to-be-positioned terminal, where a cell ID of each neighboring terminal of the at least one neighboring terminal is the same as the cell ID of the to-be-positioned terminal is performed.

In a specific implementation process, manners of determining the at least one neighboring terminal may include at least two manners below: determining the at least one neighboring terminal according to a cell ID, and determining the at least one neighboring terminal according to a cell ID and context information. Descriptions are separately provided as follows:

First, the at least one neighboring terminal is determined according to a cell ID.

That is, a terminal whose cell ID is the same as the cell ID of the to-be-positioned terminal is determined as the at least one neighboring terminal.

In a specific implementation process, the to-be-positioned terminal may communicate with a server, to determine the terminal whose cell ID is the same as the cell ID of the to-be-positioned terminal.

Specifically, that is, the to-be-positioned terminal sends the cell ID of the to-be-positioned terminal to the server. The server queries, from a storage unit, a context list including the cell ID, or the server communicates with a base station corresponding to the cell ID, to obtain a context list of the terminal corresponding to the cell ID. Therefore, the at least one neighboring terminal is determined.

For example, when a cell ID of a to-be-positioned terminal Ma is c1982, the context list may be shown in Table 1:

TABLE 1

| Terminal identifier | cell ID | Bluetooth identifier | WiFi identifier |
|---|---|---|---|
| Mb | c1982 | {b1, b2, b3} | 01 |
| Mc | c1982 | {b1, a1, a4} | 02 |
| Md | c1982 | {b1, a2, a5} | 01 |
| Me | c1982 | {c1, c2, c3} | 03 |

In Table 1, it is determined that the at least one neighboring terminal of the to-be-positioned terminal Ma includes: Mb, Mc, Md, and Me.

Specifically, a terminal whose cell ID is the same as the cell ID of the to-be-positioned terminal is determined as the at least one neighboring terminal. Because the rest data does not need to be analyzed and processed, a neighboring terminal can be determined rapidly, thereby improving positioning efficiency.

Further, in a positioning process, because there is no need to rely on an intermittently available signal source such as WiFi or Bluetooth, a case of intermittent positioning failures is avoided, thereby improving positioning reliability.

Second, the at least one neighboring terminal is determined according to a cell ID and context information.

In a specific implementation process, a candidate neighboring terminal group may first be determined according to the cell ID, then the context information is analyzed, and a neighboring terminal is determined from the candidate neighboring terminal group, or a candidate neighboring terminal group may first be determined according to the context information, and then a neighboring terminal is determined from the candidate neighboring terminal group according to the cell ID.

For a case in which a candidate neighboring terminal group is first determined according to a cell ID, and then a neighboring terminal is determined by analyzing context information, specific implementation steps may be: determining at least one candidate neighboring terminal according to the cell ID of the to-be-positioned terminal, where the at least one candidate neighboring terminal includes a candidate neighboring terminal whose cell ID is the same as the cell ID of the to-be-positioned terminal; obtaining context information of each candidate neighboring terminal of the at least one candidate neighboring terminal and context information of the to-be-positioned terminal; and determining, from the at least one candidate neighboring terminal, a candidate neighboring terminal whose context information matches the context information of the to-be-positioned terminal, to form the at least one neighboring terminal of the to-be-positioned terminal.

In a specific implementation process, the method for determining at least one candidate neighboring terminal and obtaining context information is the same as the method for determining a neighboring terminal according to a cell ID and obtaining context information of the neighboring terminal in the first case, and details are not described herein again.

In this embodiment of this application, the context information may be one or a combination of multiple of a WiFi identifier, a Bluetooth identifier, or a GPS parameter.

In a specific implementation process, when the context information is a WiFi identifier and/or a Bluetooth identifier, the determining a candidate neighboring terminal whose context information matches the context information of the to-be-positioned terminal is specifically determining the candidate neighboring terminal whose context information is the same as the context information of the to-be-positioned terminal.

When the context information is a GPS parameter, the determining a candidate neighboring terminal whose context information matches the context information of the to-be-positioned terminal is specifically determining the candidate neighboring terminal, where a matching degree between the context information of the candidate neighboring terminal and the context information of the to-be-positioned terminal is greater than a preset value.

For example, refer to Table 1 too. For example, the context information is a Bluetooth identifier. When the cell ID of the to-be-positioned terminal Ma is c1982, and the Bluetooth identifier is b1, the at least one neighboring terminal, determined from Table 1, of the to-be-positioned terminal Ma includes: Mb, Mc, and Md, but does not include Me.

For example, the context information is a WiFi identifier. When the cell ID of the to-be-positioned terminal Ma is c1982, and the WiFi identifier is 01, the at least one neighboring terminal, determined from Table 1, of the to-be-positioned terminal Ma includes: Mb and Md, but does not include Mc and Me.

For a case in which a candidate neighboring terminal group is determined according to context information, and then a neighboring terminal is determined according to a cell ID, specific implementation steps may be: determining, according to the context information of the to-be-positioned terminal, at least one candidate neighboring terminal whose context information matches the context information of the to-be-positioned terminal; and determining a candidate neighboring terminal whose cell ID is the same as the cell ID of the to-be-positioned terminal from the at least one candidate neighboring terminal, to form the at least one neighboring terminal of the to-be-positioned terminal.

For example, the context information is a Bluetooth identifier, the to-be-positioned terminal performs scanning to obtain a Bluetooth identifier of a nearby Bluetooth device, determines the Bluetooth device obtained through scanning as the at least one candidate neighboring terminal, sends a Bluetooth connection request to the scanned Bluetooth device, to establish a Bluetooth communication connection, then sends a request to obtain a cell ID of the Bluetooth device obtained through scanning, and determines a device whose cell ID is the same as the cell ID of the to-be-positioned terminal as a neighboring terminal.

For example, the context information is a GPS parameter, the to-be-positioned terminal sends a GPS parameter of the to-be-positioned terminal to a server, the server determines that a terminal whose GPS parameter represents a location close to a location represented by the GPS parameter of the to-be-positioned terminal is used as the at least one candidate neighboring terminal, and sends a cell ID of the at least one candidate neighboring terminal to the to-be-positioned terminal, to determine a device whose cell ID is the same as the cell ID of the to-be-positioned terminal as a neighboring terminal.

Specifically, with reference to the cell ID and the context information, the at least one neighboring terminal is determined, which can further narrow down a range of a neighboring terminal, improve accuracy of determining the neighboring terminal, and improve positioning precision.

After the at least one neighboring terminal is determined in step S202, step S203 of obtaining geomagnetic information of a location of each neighboring terminal of the at least one neighboring terminal and geomagnetic information of a location of the to-be-positioned terminal, to generate a geomagnetic information group of the to-be-positioned terminal is performed.

Specifically, the geomagnetic information may include: a component value in an X direction parallel to a horizontal plane, a component value in a Y direction parallel to the horizontal plane, a vertical component value in a Z direction perpendicular to the horizontal plane, and a geomagnetic precision value, where the component value in the X direction represents a geomagnetic strength in the X direction, the component value in the Y direction represents a geomagnetic strength in the Y direction, the vertical component value represents a geomagnetic strength in the Z direction, and the geomagnetic precision value represents measurement precision of a component value in each direction.

For example, the geomagnetic information may be {x, y, z, acc}, where x is the component value in the X direction, y is the component value in the Y direction, z is the vertical component value, and acc is the geomagnetic precision value.

In a specific implementation process, the geomagnetic information of the location of the to-be-positioned terminal may be obtained through sensing by using a geomagnetic sensor disposed on the to-be-positioned terminal.

In a specific implementation process, the geomagnetic information of the location of each neighboring terminal of the at least one neighboring terminal may be obtained by means of direct communication between the to-be-positioned terminal and the at least one neighboring terminal by using a WiFi connection or a Bluetooth connection, or may be obtained by means of communication between the to-be-positioned terminal and the at least one neighboring terminal by using a server, which is not limited in this embodiment.

In this embodiment of this application, to further narrow down a range of the geomagnetic information group of the to-be-positioned terminal and improve positioning precision, a vertical distribution range of a neighboring terminal for positioning may further be narrowed down according to the vertical component value in the geomagnetic information, and specific steps include: obtaining the geomagnetic information of the location of each neighboring terminal of the at least one neighboring terminal and the geomagnetic information of the location of the to-be-positioned terminal, to form a pre geomagnetic information group; and determining geomagnetic information from the pre geomagnetic information group, to form the geomagnetic information group of the to-be-positioned terminal, where a difference between a vertical component value of the determined geomagnetic information from the pre geomagnetic information group and a vertical component value of the geomagnetic information of the location of the to-be-positioned terminal is less than a preset threshold.

Specifically, geomagnetic information of a neighboring terminal basically located in one same horizontal plane with the to-be-positioned terminal is selected through screening according to the vertical component value of the geomagnetic information, to form the geomagnetic information group, thereby further narrowing down a positioning range, and improving positioning precision.

After the geomagnetic information group of the to-be-positioned terminal is generated in step S203, step S204 of obtaining, according to the geomagnetic information group of the to-be-positioned terminal, geographic location information of the to-be-positioned terminal is performed.

In this embodiment of this application, a manner of obtaining the geographic location information of the to-be-positioned terminal may be: sending the geomagnetic information group of the to-be-positioned terminal to a positioning server; and then receiving the geographic location information of the to-be-positioned terminal returned by the positioning server based on the geomagnetic information group of the to-be-positioned terminal.

Specifically, a manner of obtaining the geographic location information of the to-be-positioned terminal returned by the positioning server may be: first determining, by the positioning server, an area matching the geomagnetic information group of the to-be-positioned terminal in an actually measured geomagnetic information map, and then obtaining terrestrial coordinates and the geographic location information that are of the area according to a terrestrial coordinate system.

In a specific implementation process, to improve efficiency of subsequent positioning, after determining the geographic location information of the to-be-positioned terminal, the positioning server may correspondingly store the cell identifier, the geomagnetic information group, the terrestrial coordinates, and the geographic location information that are of the to-be-positioned terminal, for use in a subsequent positioning process.

Specifically, during primary positioning, according to a highly stable cell ID positioning technology, a neighboring terminal whose cell identity is the same as a target cell identity of a to-be-positioned terminal is determined, a geomagnetic information group is generated according to geomagnetic information of a location of the neighboring terminal and target geomagnetic information of a location of the to-be-positioned terminal, to position geographic location information by using a geomagnetic positioning technology, which not only keeps stability of the cell ID positioning technology, but also improves positioning precision by means of hierarchical positioning.

After the primary positioning is introduced, the secondary positioning is introduced next.

Figure 3:
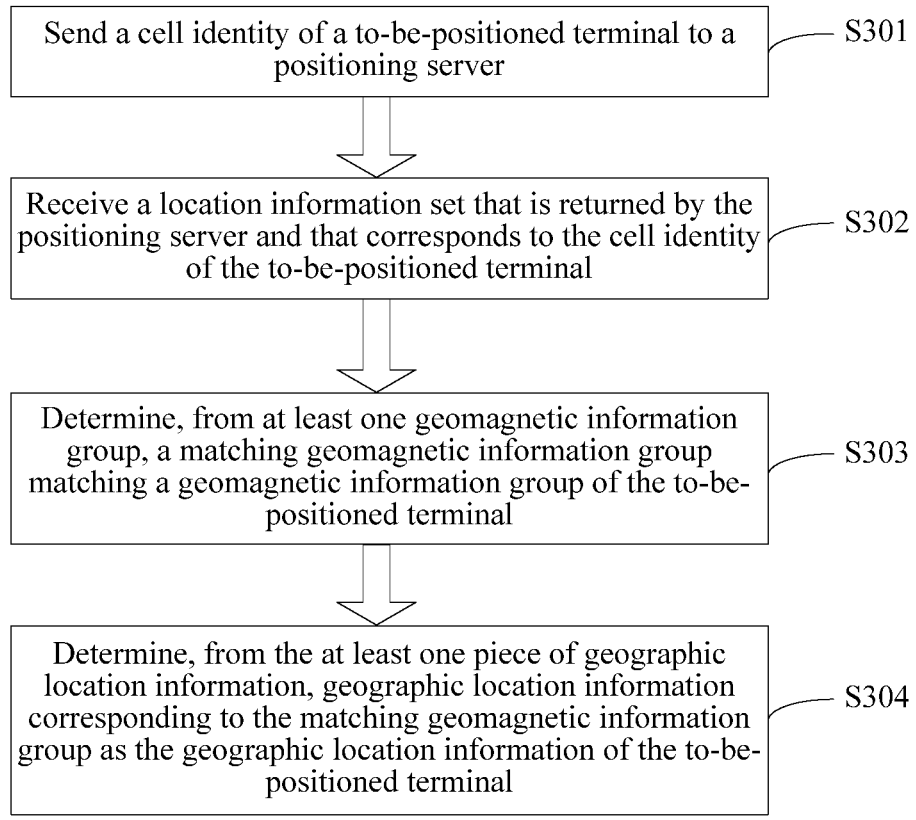
FIG. 3 is a flowchart on a side of a to-be-positioned terminal during secondary positioning according to an embodiment of the present disclosure.

The secondary positioning is rapid positioning performed by using the geographic location information pre-stored in the previous positioning process, and specific implementation steps of the secondary positioning are described in detail below also by using an example in which the positioning method is applied to a to-be-positioned terminal:

The secondary positioning also includes step S201, step S202, step S203, and step S204 in the primary positioning, where the obtaining, according to the geomagnetic information group of the to-be-positioned terminal, geographic location information of the to-be-positioned terminal in step S204, as shown in FIG. 3, includes:

Step S301: Send the cell identity of the to-be-positioned terminal to a positioning server.

Step S302: Receive a location information set that is returned by the positioning server and that corresponds to the cell identity of the to-be-positioned terminal, where the location information set includes: at least one geomagnetic information group and at least one piece of geographic location information corresponding to the at least one geomagnetic information group.

Step S303: Determine, from the at least one geomagnetic information group, a matching geomagnetic information group matching the geomagnetic information group of the to-be-positioned terminal.

Step S304: Determine, from the at least one piece of geographic location information, geographic location information corresponding to the matching geomagnetic information group as the geographic location information of the to-be-positioned terminal.

In a specific implementation process, the matching geomagnetic information group may be a geomagnetic information group that is the same as the geomagnetic information group of the to-be-positioned terminal, or may be a geomagnetic information group having a matching degree between the geomagnetic information group and the geomagnetic information group of the to-be-positioned terminal being greater than a threshold, which is not limited in this embodiment.

For example, when a cell ID of a to-be-positioned terminal Ma is c1982, and a geomagnetic information group is {x0', y0', z0', acc0'}, {x1', y1', z1', acc1'}, and {x2', y2', z2', acc2'}:

The to-be-positioned terminal sends the cell ID to the positioning server.

After receiving the cell ID, the positioning server parses that the cell ID is c1982, reads, from a storage unit, all geomagnetic information groups stored corresponding to c1982, and corresponding geographic location information, to form a location information set, and sends the location information set to the to-be-positioned terminal. The location information set is shown in Table 2:

TABLE 2

| CELL ID | Geomagnetic information groups | Geographic location information |
|---|---|---|
| c1982 | First group: {x0, y0, z0, acc0}, {x1, y1, z1, acc1}, {x2, y2, z2, acc2}, and {x3, y3, z3, acc3} | Address: No. 10 First Avenue, Beijing Longitude: 88 Latitude: 33 Precision: 100 m Name: the No. 1 noodle restaurant |
|  | Second group: {xa, ya, za, acca}, {xb, yb, zb, accb}, and {xc, yc, zc, accc} | Address: No. 6 Second avenue, Beijing Longitude: 87 Latitude: 32 Precision: 20 m Name: the No. 1 pastry shop |

Next, the to-be-positioned terminal determines, from the received geomagnetic information groups, a matching geomagnetic information group matching the geomagnetic information group of the to-be-positioned terminal.

For example, the geomagnetic information group is a geomagnetic information group including geomagnetic information of a neighboring terminal that is obtained through screening according to the vertical component value of the geomagnetic information and that is basically located in a same horizontal plane with the to-be-positioned terminal, and a specific matching manner is as follows:

A component value in an X direction and a component value in a Y direction in the geomagnetic information group of the to-be-positioned terminal are separately multiplied by a geomagnetic precision value to obtain the geomagnetic information group of the to-be-positioned terminal after precision is weighted:

{x0'*acc0', y0'*acc0', z0'}, {x1'*acc1', y1'*acc1', z1'*acc1'}, and {x2'*acc2', y2'*acc2', z2'}

Similarly, a component value in an X direction and a component value in a Y direction of each geomagnetic information group in the location information set are separately multiplied by a corresponding geomagnetic precision value, to obtain the geomagnetic information group of the location information set after precision is weighted as follows:

A first geomagnetic information group after precision is weighted in Table 2:
{x0*acc0, y0*acc0, z0}, {x1*acc1, y1*acc1, z1}, {x2*acc2, y2*acc2, z2}, and {x3*acc3, y3*acc3, z3}

A second geomagnetic information group after precision is weighted in Table 2:
{xa*acca, ya*acca, za}, {xb*accb, yb*accb, zb}, and {xc*accc, yc*accc, zc}

A matching degree of each geomagnetic information group is separately calculated according to the geomagnetic information after precision is weighted, and details are as follows:

A matching degree between the first geomagnetic information group in Table 2 and the geomagnetic information group of the to-be-positioned terminal $$P1 = \left(\frac{x0^*acc0}{x0'^*acc0'} + \frac{y0^*acc0}{y0'^*acc0'}\right) + \left(\frac{x1^*acc1}{x0'^*acc0'} + \frac{y1^*acc1}{y0'^*acc0'}\right) + \left(\frac{x2^*acc2}{x0'^*acc0'} + \frac{y2^*acc2}{y0'^*acc0'}\right) + \left(\frac{x3^*acc3}{x0'^*acc0'} + \frac{y3^*acc3}{y0'^*acc0'}\right) +$$

$$\left(\frac{x0^*acc0}{x1'^*acc1'} + \frac{y0^*acc0}{y1'^*acc1'}\right) + \left(\frac{x1^*acc1}{x1'^*acc1'} + \frac{y1^*acc1}{y1'^*acc1'}\right) +$$
$$\left(\frac{x2^*acc2}{x1'^*acc1'} + \frac{y2^*acc2}{y1'^*acc1'}\right) + \left(\frac{x3^*acc3}{x1'^*acc1'} + \frac{y3^*acc3}{y1'^*acc1'}\right) +$$
$$\left(\frac{x0^*acc0}{x2'^*acc2'} + \frac{y0^*acc0}{y2'^*acc2'}\right) + \left(\frac{x1^*acc1}{x2'^*acc2'} + \frac{y1^*acc1}{y2'^*acc2'}\right) +$$
$$\left(\frac{x2^*acc2}{x2'^*acc2'} + \frac{y2^*acc2}{y2'^*acc2'}\right) + \left(\frac{x3^*acc3}{x2'^*acc2'} + \frac{y3^*acc3}{y2'^*acc2'}\right)$$

A matching degree between the second geomagnetic information group in Table 2 and the geomagnetic information group of the to-be-positioned terminal $$P2 = \left(\frac{xa^*acca}{x0'^*acc0'} + \frac{ya^*acca}{y0'^*acc0'}\right) +$$
$$\left(\frac{xb^*accb}{x0'^*acc0'} + \frac{yb^*accb}{y0'^*acc0'}\right) + \left(\frac{xc^*accc}{x0'^*acc0'} + \frac{yc^*accc}{y0'^*acc0'}\right) +$$
$$\left(\frac{xa^*acca}{x1'^*acc1'} + \frac{yc^*acca}{y1'^*acc1'}\right) + \left(\frac{xb^*accb}{x1'^*acc1'} + \frac{yb^*accb}{y1'^*acc1'}\right) +$$
$$\left(\frac{xc^*accc}{x1'^*acc1'} + \frac{yc^*accc}{y1'^*acc1'}\right) + \left(\frac{xa^*acca}{x2'^*acc2'} + \frac{yc^*acca}{y2'^*acc2'}\right) +$$
$$\left(\frac{xb^*accb}{x2'^*acc2'} + \frac{yb^*accb}{y2'^*acc2'}\right) + \left(\frac{xc^*accc}{x2'^*acc2'} + \frac{yc^*accc}{y2'^*acc2'}\right)$$

It is assumed that P1 is equal to 0.8, P2 is equal to 0.72, and because P1 is greater than P2, the first geomagnetic information group having a relatively high matching degree in Table 2 is determined as a matching geomagnetic information group, so that geographic location information corresponding to the first geomagnetic information group is determined, that is, the No. 1 noodle restaurant, No. 10 First Avenue, Beijing, is the geographic location information of the to-be-positioned terminal.

In a specific implementation process, during secondary positioning, a to-be-positioned terminal may also send a geomagnetic information group to a positioning server, and on a side of the positioning server, matching is performed to obtain a geomagnetic information group, and geographic location information corresponding to the matching geomagnetic information group is determined. In this case, specific steps of the obtaining, by the to-be-positioned terminal, the geographic location information of the to-be-positioned terminal are as follows: sending the cell identity of the to-be-positioned terminal and the geomagnetic information group of the to-be-positioned terminal to the positioning server; receiving the geographic location information that is returned by the positioning server and that corresponds to the matching geomagnetic information group matching the geomagnetic information group of the to-be-positioned terminal; and determining the geographic location information corresponding to the matching geomagnetic information group as the geographic location information of the to-be-positioned terminal.

Specifically, the method for performing matching on a side of the positioning server to obtain a matching geomagnetic information group is the same as the method for obtaining a matching geomagnetic information group through matching by a to-be-positioned terminal, and details are not described herein again.

Certainly, the positioning method may also be applied to a positioning server, and when the positioning method is applied to the positioning server, specific steps are as follows:

First, step S201 of obtaining a cell ID of a to-be-positioned terminal is performed.

In a specific implementation process, the positioning server may receive the cell ID and a positioning request that are sent by the to-be-positioned terminal.

Next, step S202 of determining at least one neighboring terminal of the to-be-positioned terminal according to the cell ID of the to-be-positioned terminal, where a cell ID of each neighboring terminal of the at least one neighboring terminal is the same as the cell ID of the to-be-positioned terminal is performed.

In a specific implementation process, the positioning server may communicate with a base station in a cell at which the to-be-positioned terminal is located, to determine the at least one neighboring terminal, or may read a pre-stored correspondence between a cell ID and a terminal from a storage unit to determine the at least one neighboring terminal.

Next, step S203 of obtaining geomagnetic information of a location of each neighboring terminal of the at least one neighboring terminal and geomagnetic information of a location of the to-be-positioned terminal, to generate a geomagnetic information group of the to-be-positioned terminal is performed.

In a specific implementation process, the positioning server may communicate with the at least one neighboring terminal and the to-be-positioned terminal, to obtain the geomagnetic information group, or may communicate with the at least one neighboring terminal by using the to-be-positioned terminal, to obtain the geomagnetic information group.

Then, step S204 of obtaining, according to the geomagnetic information group of the to-be-positioned terminal, geographic location information of the to-be-positioned terminal is performed.

During primary positioning, the positioning server may first determine an area matching the geomagnetic information group of the to-be-positioned terminal in an actually measured geomagnetic information map, and then obtain terrestrial coordinates and geographic location information that are of the area according to a terrestrial coordinate system.

During secondary positioning, the positioning server may find, from a pre-stored location information set, a matching geomagnetic information group matching the geomagnetic information group of the to-be-positioned terminal, and then determine the geographic location information corresponding to the matching geomagnetic information group as the geographic location information of the to-be-positioned terminal.

Because a positioning principle during application of the positioning method to the positioning server is basically the same as a positioning principle during application of the positioning method to the to-be-positioned terminal, details are not described herein again.

In a specific implementation process, when the geographic location information obtained during primary positioning or secondary positioning cannot meet a requirement of positioning precision of a user, a positioning map may be output for the user to perform accurate positioning. That is, after the geographic location information of the to-be-positioned terminal is obtained in step S204: obtaining positioning precision of the geographic location information of the to-be-positioned terminal; determining whether the positioning precision meets a preset precision requirement; and when the positioning precision does not meet the preset precision requirement, displaying a set positioning map;

detecting a determining operation that is triggered to determine a positioning point on the positioning map; and based on the determining operation, obtaining information about a precise geographic location of the positioning point as the geographic location information of the to-be-positioned terminal.

Specifically, when the positioning precision cannot meet the preset precision requirement, the positioning map is output for the user to perform positioning, which can avoid complex operation steps each time because a user needs to perform positioning, and also can ensure positioning precision.

Specifically, according to the positioning method provided by this application, a cell ID is first used to obtain a relatively large positioning range, and then a to-be-positioned terminal and geomagnetic information of a location of a neighboring terminal of the to-be-positioned terminal are used to perform precise positioning, which, on one hand, can overcome a defect that the method for positioning by using an active source signal device such as WiFi and Bluetooth is not stable, thereby improving positioning stability, and on the other hand, overcomes a defect that the method for positioning by using a cell ID has low precision, thereby improving positioning precision. In addition, the to-be-positioned terminal and geomagnetic information of the location of the neighboring terminal of the to-be-positioned terminal are used to perform coordinated positioning, which can avoid a defect of inaccurate positioning when only geomagnetic information is used for positioning, thereby improving positioning accuracy, and implementing a technical effect that positioning stability, precision, and accuracy are achieved simultaneously.

Next, when the positioning method in Embodiment 1 is applied to a to-be-positioned terminal, the method is described from a perspective of a positioning server in the system shown in FIG. 1.

Embodiment 2

In this embodiment, there are two cases: primary positioning and secondary positioning, and a case in which the method provided in Embodiment 1 is applied to a to-be-positioned terminal on a side of a positioning server is described.

Figure 4:
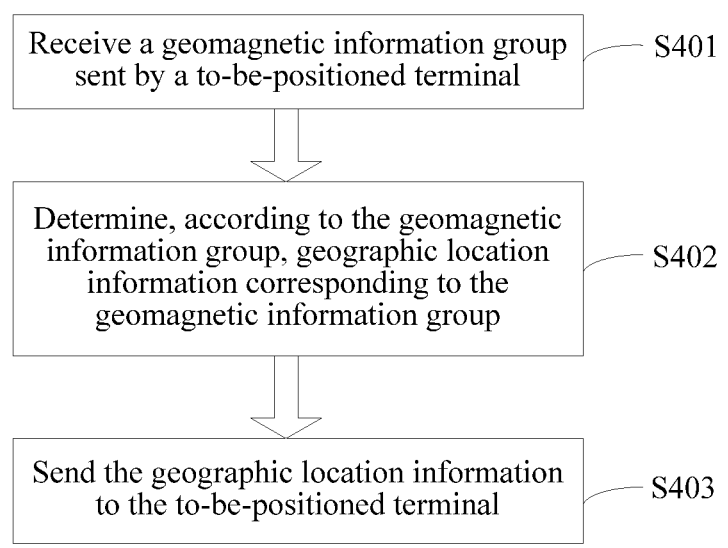
FIG. 4 is a flowchart on a side of a positioning server during primary positioning according to an embodiment of the present disclosure.

For primary positioning, referring to FIG. 4, FIG. 4 is a processing flowchart on a side of a positioning server during primary positioning according to an embodiment of the present disclosure.

The positioning method includes:

Step S401: Receive a geomagnetic information group sent by a to-be-positioned terminal, where the geomagnetic information group includes geomagnetic information of a location of a neighboring terminal and geomagnetic information of a location of the to-be-positioned terminal, where the neighboring terminal is a terminal whose cell identity is the same as a cell identity of the to-be-positioned terminal.

Step S402: Determine, according to the geomagnetic information group, geographic location information corresponding to the geomagnetic information group.

Step S403: Send the geographic location information to the to-be-positioned terminal.

In a specific implementation process, the to-be-positioned terminal may be a terminal such as a mobile phone, a tablet computer, or a smart watch, which is not limited in this embodiment.

In a specific implementation process, the determining, according to the geomagnetic information group, geographic location information corresponding to the geomagnetic information group in step S402 may be: first determining, by a positioning server, an area matching the geomagnetic information group of the to-be-positioned terminal in an actually measured geomagnetic information map, and then obtaining terrestrial coordinates and the geographic location information that are of the area according to a terrestrial coordinate system.

Figure 5:
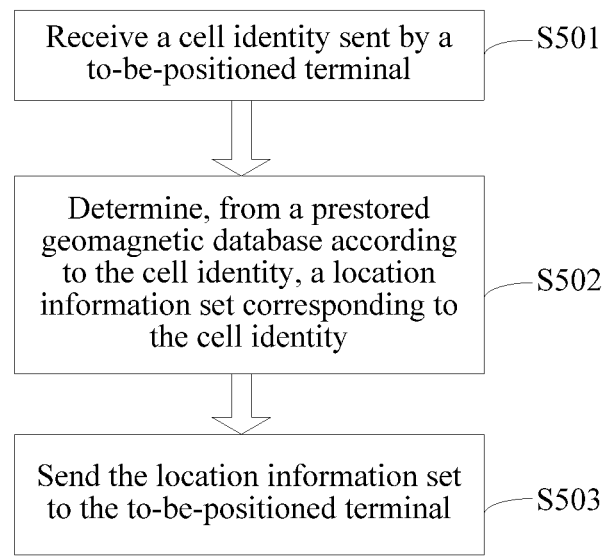
FIG. 5 is a flowchart 1 on a side of a positioning server during secondary positioning according to an embodiment of the present disclosure.

For secondary positioning, referring to FIG. 5, FIG. 5 is a processing flowchart 1 on a side of a positioning server during secondary positioning according to an embodiment of the present disclosure.

The positioning method includes:

Step S501: Receive a cell identity sent by a to-be-positioned terminal.

Step S502: Determine, from a pre-stored geomagnetic database according to the cell identity, a location information set corresponding to the cell identity, where the location information set includes: at least one geomagnetic information group and at least one piece of geographic location information corresponding to the at least one geomagnetic information group.

Step S503: Send the location information set to the to-be-positioned terminal.

In a specific implementation process, the to-be-positioned terminal may be a terminal such as a mobile phone, a tablet computer, or a smart watch, which is not limited in this embodiment.

In a specific implementation process, the determining, from a pre-stored geomagnetic database according to the cell ID, a location information set corresponding to the cell identity in step S502 may be: parsing, by a positioning server after the positioning server receives the cell ID, a value of the cell ID, and reading, from a storage unit, all geomagnetic information groups stored corresponding to the value of the cell ID, and the corresponding geographic location information, to form the location information set.

Figure 6:
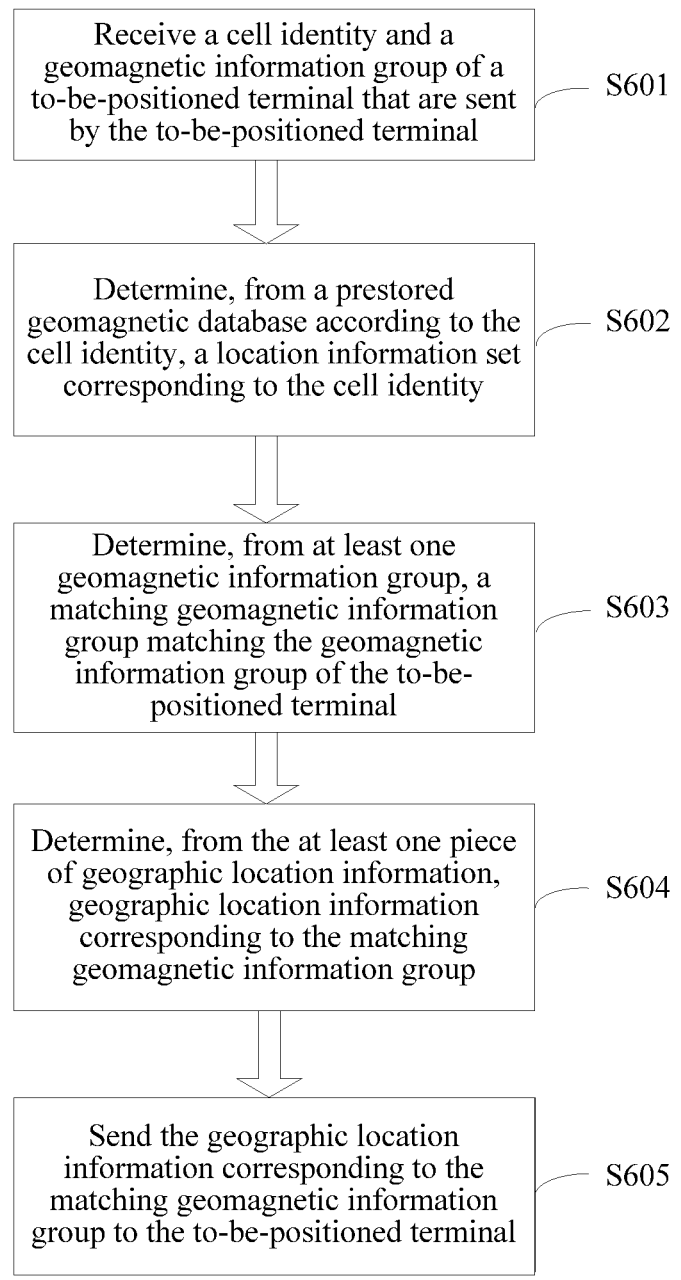
FIG. 6 is a flowchart 2 on a side of a positioning server during secondary positioning according to an embodiment of the present disclosure.

In a specific implementation process, during secondary positioning, a to-be-positioned terminal may also send a geomagnetic information group to the positioning server, and on a side of a positioning server, matching is performed to obtain a matching geomagnetic information group, and geographic location information corresponding to the matching geomagnetic information group is determined. Referring to FIG. 6, FIG. 6 is a processing flowchart 2 on a side of a positioning server during secondary positioning according to an embodiment of the present disclosure.

In this case, specific steps of secondary positioning on the side of the positioning server are as follows:

Step S601: Receive a cell identity and a geomagnetic information group of a to-be-positioned terminal that are sent by the to-be-positioned terminal.

Step S602: Determine, from a pre-stored geomagnetic database according to the cell identity, a location information set corresponding to the cell identity, where the location information set includes: at least one geomagnetic information group and at least one piece of geographic location information corresponding to the at least one geomagnetic information group.

Step S603: Determine, from the at least one geomagnetic information group, a matching geomagnetic information group matching the geomagnetic information group of the to-be-positioned terminal.

Step S604: Determine, from the at least one piece of geographic location information, geographic location information corresponding to the matching geomagnetic information group.

Step S605: Send the geographic location information corresponding to the matching geomagnetic information group to the to-be-positioned terminal.

Embodiment 3

In this embodiment, a positioning method is provided.

Figure 7:
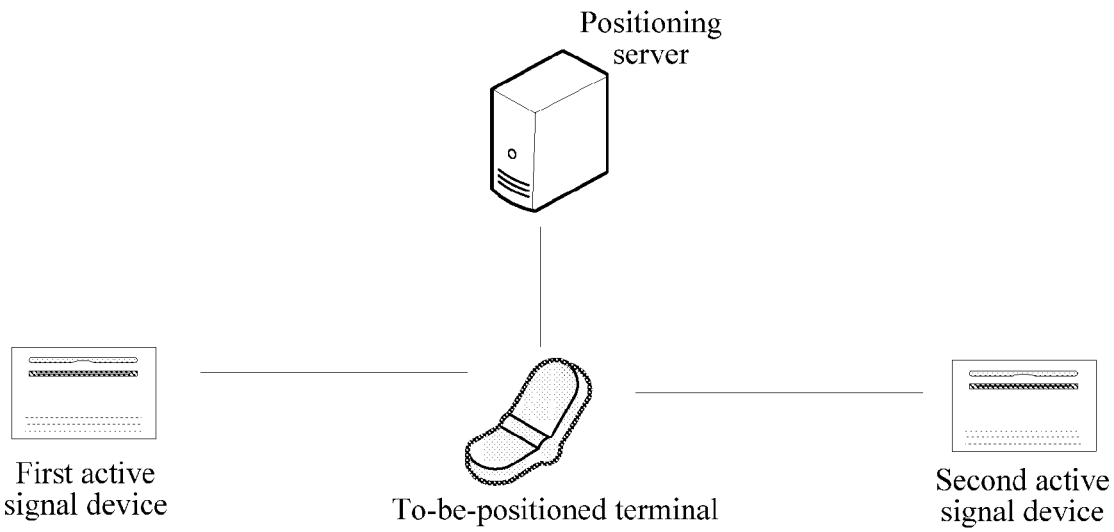
FIG. 7 is a schematic diagram of a system corresponding to a positioning method according to another embodiment of the present disclosure.

Before this embodiment is introduced, a system corresponding to the positioning method in this embodiment is introduced first. As shown in FIG. 7, FIG. 7 shows a system used to implement the positioning method provided in this embodiment, and the system includes: a positioning server, a to-be-positioned terminal, and at least one active signal device.

Figure 8:
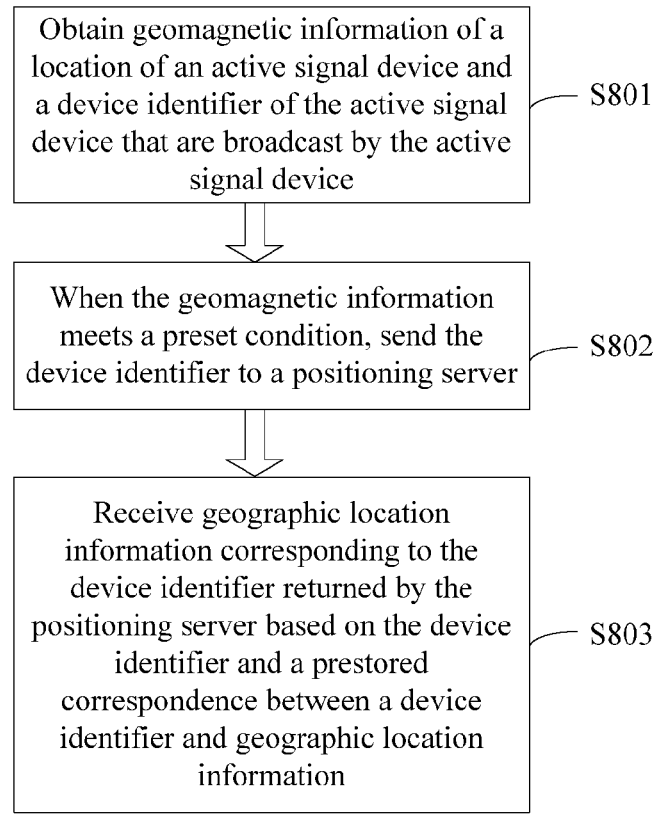
FIG. 8 is a flowchart of a positioning method according to another embodiment of the present disclosure.

As shown in FIG. 8, the positioning method includes:

Step S801: Obtain geomagnetic information of a location of an active signal device and a device identifier of the active signal device that are broadcast by the active signal device.

Step S802: When the geomagnetic information meets a preset condition, send the device identifier to the positioning server.

Step S803: Receive geographic location information corresponding to the device identifier returned by the positioning server based on the device identifier and a pre-stored correspondence between a device identifier and geographic location information.

In a specific implementation process, the positioning method provided in this embodiment may be applied to a to-be-positioned terminal such as a mobile phone, a tablet computer, or a smart watch, which is not limited in this embodiment.

In a specific implementation process, the active signal device may be a Bluetooth device using a Bluetooth technology to perform broadcasting, or may be a WiFi device that performs broadcasting by using a WiFi technology, which is not limited in this embodiment.

The method provided in this embodiment is described below:

First, step S801 of obtaining geomagnetic information of a location of an active signal device and a device identifier of the active signal device that are broadcast by the active signal device is performed.

Specifically, after receiving a positioning request, the to-be-positioned terminal searches for and receives signaling broadcast by the nearby active signal device by using WiFi or Bluetooth, and parses the received signaling, to obtain the geomagnetic information of the active signal device and the device identifier of the active signal device.

Next, step S802 of sending the device identifier to the positioning server when the geomagnetic information meets a preset condition is performed.

In a specific implementation process, the geomagnetic information meets the preset condition, and there may be at least two cases: In one case, the geomagnetic information meets an area limitation, and in the other case, the geomagnetic information matches history geomagnetic information. The two cases are separately described below:

First, the geomagnetic information meets the area limitation.

That is, the sending the device identifier to the positioning server when the geomagnetic information meets a preset condition is determining whether a component value in the geomagnetic information is within a preset value range; and when the component value in the geomagnetic information is within the preset value range, send the device identifier to the positioning server.

Specifically, that is, it is first determined that any one or more of a component value in an X direction, a component value in a Y direction, a component value in a Z direction, and a geomagnetic precision value in the geomagnetic information are within the preset value range, so that it is determined whether an area corresponding to the geomagnetic information in a terrestrial coordinate system is in a preset area.

When it is determined that the area corresponding to the geomagnetic information in the terrestrial coordinate system is in the one preset area, then the device identifier is sent to the positioning server.

In a specific implementation process, the preset area may be an initial area determined according to a positioning technology such as a cell ID technology.

Specifically, when the component value in the geomagnetic information is within the preset value range, the device identifier is sent to the positioning server for positioning, thereby ensuring that geomagnetic information for positioning meets a requirement of positioning precision, and improving positioning precision.

Second, the geomagnetic information matches the history geomagnetic information.

That is, the sending the device identifier to the positioning server when the geomagnetic information meets a preset condition is determining whether the geomagnetic information matches pre-stored history geomagnetic information corresponding to the device identifier; and when the geomagnetic information matches the history geomagnetic information, sending the device identifier to the positioning server.

In a specific implementation process, the method for determining whether the geomagnetic information matches the history geomagnetic information may be: determining whether a matching degree between the geomagnetic information and the history geomagnetic information is greater than a preset threshold.

A specific method for calculating a matching degree may be the same as the method for calculating a matching degree provided in Embodiment 1, and details are not described herein again.

Specifically, when the geomagnetic information matches the history geomagnetic information, the device identifier is sent to the positioning server for positioning, to screen out geomagnetic information sent by the active signal device whose position changes greatly, thereby ensuring that geomagnetic information for positioning meets an accuracy requirement, and improving positioning accuracy.

The method is described below from a perspective of an active signal device in the system shown in FIG. 7.

Embodiment 4

Figure 9:
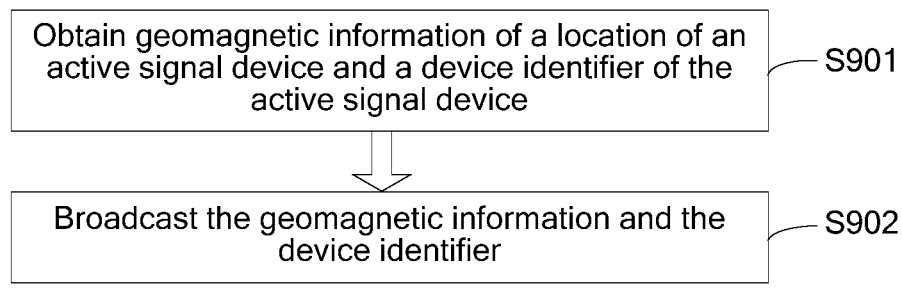
FIG. 9 is a flowchart of a positioning method on a side of a positioning server according to another embodiment of the present disclosure.

In this embodiment, the foregoing method is described from a side of an active signal device. Referring to FIG. 9, FIG. 9 is a processing flowchart on the side of the active signal device according to an embodiment of the present disclosure.

The positioning method includes:

Step S901: Obtain geomagnetic information of a location of an active signal device and a device identifier of the active signal device.

Step S902: Broadcast the geomagnetic information and the device identifier.

In a specific implementation process, the positioning method provided in this embodiment may be applied to an active signal device that performs broadcasting by using a Bluetooth technology, or may be applied to an active signal device that performs broadcasting by using a WiFi technology, which is not limited in this embodiment.

In a specific implementation process, the geomagnetic information of the location of the active signal device may be obtained through sensing by using a geomagnetic sensor disposed on the active signal device.

Next, with reference to FIG. 7, from a perspective of interaction among the active signal device, a to-be-positioned terminal, and a positioning server, specific steps for implementing the positioning methods in Embodiment 3 and Embodiment 4 are described: invoking, by the active signal device, a geomagnetic sensor to obtain geomagnetic data; correspondingly storing, by the active signal device, a timestamp and the geomagnetic data; broadcasting, by the active signal device, geomagnetic data, device information, a device ID, signaling strength, and the like that are currently obtained; obtaining and receiving, by the to-be-positioned terminal after the to-be-positioned terminal receives a positioning request, signaling broadcast by the active signal device; positioning and parsing, by the to-be-positioned terminal, a signaling message, separately identifying a status of a geomagnetic record of each device in the message, sequentially identifying, according to geomagnetic values of an X axis, a Y axis, and a Z axis, an identifier of a device whose geomagnetic data changes greatly and an identifier of a device whose geomagnetic data changes within an allowable range, and setting a device identifier group after a status is identified to a device identifier group for querying a location; sending, by the to-be-positioned terminal, the device identifier group for querying a location to the positioning server, to request to query a location; setting, by the positioning server, the identifier of the device whose geomagnetic data changes greatly to be invalid, and obtaining location information corresponding to the identifier of the device whose geomagnetic data changes within the allowable range; returning, by the positioning server, the location information to a location query unit; and returning, by the location query unit, queried location information to the to-be-positioned terminal.

Embodiment 5

Based on a same inventive concept, this application further provides an electronic device.

Figure 10:
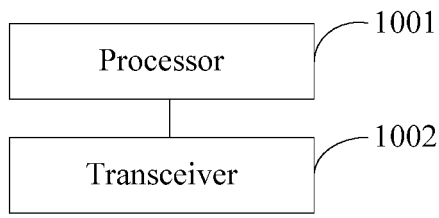
FIG. 10 is a schematic structural diagram of an electronic device according to an embodiment of the present disclosure.

As shown in FIG. 10, the electronic device includes: a processor 1001 configured to obtain a cell identity of a to-be-positioned terminal; and determine at least one neighboring terminal of the to-be-positioned terminal according to the cell identity of the to-be-positioned terminal, where a cell identity of each neighboring terminal of the at least one neighboring terminal is the same as the cell identity of the to-be-positioned terminal; and a transceiver 1002 configured to obtain geomagnetic information of a location of each neighboring terminal of the at least one neighboring terminal determined by the processor 1001 and geomagnetic information of a location of the to-be-positioned terminal, to generate a geomagnetic information group of the to-be-positioned terminal; and obtain, according to the geomagnetic information group of the to-be-positioned terminal, geographic location information of the to-be-positioned terminal.

A specific connection relationship is: the processor 1001 is connected to the transceiver 1002.

In this embodiment, the electronic device may be a terminal such as a mobile phone, a tablet computer, or a smart watch, or may be a positioning server, which is not limited in this embodiment.

In this embodiment, when the electronic device is a terminal, the transceiver 1002 is further configured to: send the geomagnetic information group of the to-be-positioned terminal to a positioning server; and receive the geographic location information of the to-be-positioned terminal returned by the positioning server based on the geomagnetic information group of the to-be-positioned terminal.

In this embodiment, when the electronic device is a terminal, the transceiver 1002 is further configured to: send the cell identity of the to-be-positioned terminal to the positioning server, receive a location information set that is returned by the positioning server and that corresponds to the cell identity of the to-be-positioned terminal, where the location information set includes at least one geomagnetic information group and at least one piece of geographic location information corresponding to the at least one geomagnetic information group; and the processor 1001 is further configured to: determine, from the at least one geomagnetic information group, a matching geomagnetic information group matching the geomagnetic information group of the to-be-positioned terminal; and determine, from the at least one piece of geographic location information, geographic location information corresponding to the matching geomagnetic information group as the geographic location information of the to-be-positioned terminal.

In this embodiment, when the electronic device is a terminal, the transceiver 1002 is further configured to: send the cell identity of the to-be-positioned terminal and the geomagnetic information group of the to-be-positioned terminal to the positioning server, and receive the geographic location information that is returned by the positioning server and that corresponds to a matching geomagnetic information group matching the geomagnetic information group of the to-be-positioned terminal; and the processor 1001 is further configured to determine the geographic location information corresponding to the matching geomagnetic information group as the geographic location information of the to-be-positioned terminal.

Further, the processor 1001 is further configured to: determine at least one candidate neighboring terminal according to the cell identity of the to-be-positioned terminal, where the at least one candidate neighboring terminal includes a candidate neighboring terminal whose cell identity is the same as the cell identity of the to-be-positioned terminal; obtain context information of each candidate neighboring terminal of the at least one candidate neighboring terminal and context information of the to-be-positioned terminal; and determine, from the at least one candidate neighboring terminal, a candidate neighboring terminal whose context information matches the context information of the to-be-positioned terminal, to form at least one neighboring terminal of the to-be-positioned terminal.

Specifically, the context information is one or a combination of multiple of a WiFi identifier, a Bluetooth identifier, or a GPS parameter.

Further, the transceiver 1002 is further configured to: obtain geomagnetic information of a location of each neighboring terminal of the at least one neighboring terminal and the geomagnetic information of the location of the to-be-positioned terminal, to form a pre geomagnetic information group, and send the pre geomagnetic information group to the processor 1001; and the processor 1001 is further configured to: receive the pre geomagnetic information group sent by the transceiver 1002, determine geomagnetic information from the pre geomagnetic information group, to form the geomagnetic information group of the to-be-positioned terminal, where a difference between a vertical component value of the determined geomagnetic information from the pre geomagnetic information group and a vertical component value of the geomagnetic information of the location of the to-be-positioned terminal is less than a preset threshold.

In this embodiment, the processor 1001 is further configured to: obtain positioning precision of the geographic location information of the to-be-positioned terminal; determine whether the positioning precision meets a preset precision requirement; and when the positioning precision does not meet the preset precision requirement, control to display a set positioning map; and after detecting a determining operation that is triggered to determine a positioning point on the positioning map, based on the determining operation, obtain information about a precise geographic location of the positioning point as the geographic location information of the to-be-positioned terminal.

The electronic device provided in this embodiment and the positioning method in Embodiment 1 are two aspects based on a same inventive concept, an implementation process of the method is already described above in detail, so that a person skilled in the art can clearly learn a device structure and the implementation process in this embodiment according to the description above, and for brevity of the specification, details are not described herein again.

Embodiment 6

Based on a same inventive concept, this application further provides a positioning server.

Figure 11:
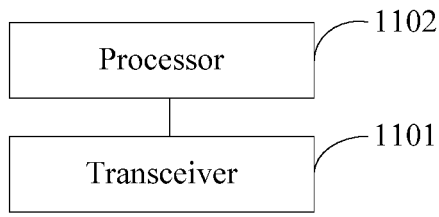
FIG. 11 is a schematic structural diagram 1 of a positioning server according to an embodiment of the present disclosure.

As shown in FIG. 11, the positioning server includes: a transceiver 1101 configured to receive a geomagnetic information group sent by a to-be-positioned terminal, and send the geomagnetic information group to a processor, where the geomagnetic information group includes geomagnetic information of a location of a neighboring terminal and geomagnetic information of a location of the to-be-positioned terminal, where the neighboring terminal is a terminal whose cell identity is the same as a cell identity of the to-be-positioned terminal; and a processor 1102 configured to determine, according to the geomagnetic information group sent by the transceiver 1101, geographic location information corresponding to the geomagnetic information group, and control the transceiver to send the geographic location information to the to-be-positioned terminal.

A specific connection relationship is: the processor 1102 is connected to the transceiver 1101.

Based on a same inventive concept, this application further provides a positioning server.

Figure 12:
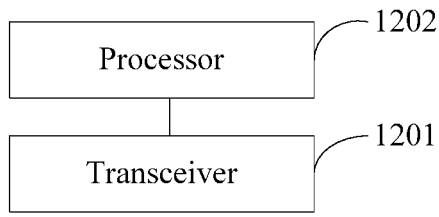
FIG. 12 is a schematic structural diagram 2 of a positioning server according to an embodiment of the present disclosure.

As shown in FIG. 12, the positioning server includes: a transceiver 1201 configured to receive a cell identity sent by a to-be-positioned terminal, and send the cell identity to a processor 1202; and the processor 1202 configured to determine, from a pre-stored geomagnetic database according to the cell identity sent by the transceiver 1201, a location information set corresponding to the cell identity, where the location information set includes at least one geomagnetic information group and at least one piece of geographic location information corresponding to the at least one geomagnetic information group; and control the transceiver to send the location information set to the to-be-positioned terminal.

A specific connection relationship is: the processor 1202 is connected to the transceiver 1201.

Based on a same inventive concept, this application further provides a positioning server.

Figure 13:
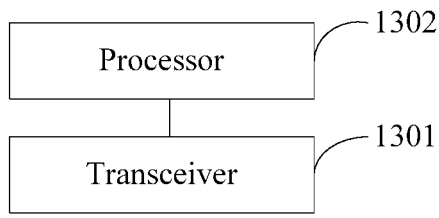
FIG. 13 is a schematic structural diagram 3 of a positioning server according to an embodiment of the present disclosure.

As shown in FIG. 13, the positioning server includes: a transceiver 1301 configured to: receive a cell identity sent by a to-be-positioned terminal and a geomagnetic information group of the to-be-positioned terminal; and send the cell identity and the geomagnetic information group of the to-be-positioned terminal to a processor 1302; and the processor 1302 configured to: determine, from a pre-stored geomagnetic database according to the cell identity, a location information set corresponding to the cell identity, where the location information set includes at least one geomagnetic information group and at least one piece of geographic location information corresponding to the at least one geomagnetic information group; determine, from the at least one geomagnetic information group, a matching geomagnetic information group matching the geomagnetic information group of the to-be-positioned terminal; determine, from the at least one piece of geographic location information, geographic location information corresponding to the matching geomagnetic information group; and control the transceiver 1301 to send the geographic location information corresponding to the matching geomagnetic information group to the to-be-positioned terminal.

A specific connection relationship is: the processor 1302 is connected to the transceiver 1301.

The positioning server provided in this embodiment and the positioning method in Embodiment 2 are two aspects based on a same inventive concept, an implementation process of the method is already described above in detail, so that a person skilled in the art can clearly learn a device structure and the implementation process in this embodiment according to the description above, and for brevity of the specification, details are not described herein again.

Embodiment 7

Based on a same inventive concept, this application further provides a terminal.

Figure 14:
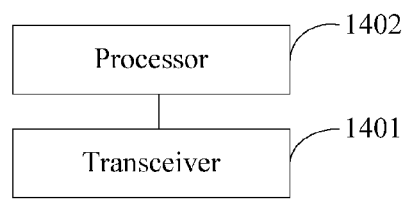
FIG. 14 is a schematic structural diagram of a terminal according to an embodiment of the present disclosure.

As shown in FIG. 14, the terminal includes: a transceiver 1401 configured to: obtain geomagnetic information of a location of an active signal device and a device identifier of the active signal device that are broadcast by the active signal device; when the geomagnetic information meets a preset condition, send the device identifier to a positioning server; and receive geographic location information that corresponds to the device identifier and that is returned by the positioning server based on the device identifier and a pre-stored correspondence between a device identifier and geographic location information.

Further, the terminal further includes: a processor 1402 configured to: receive the geomagnetic information and the device identifier that are sent by the transceiver 1401, determine whether the geomagnetic information matches pre-stored history geomagnetic information corresponding to the device identifier, and when the geomagnetic information matches the history geomagnetic information, control the transceiver 1401 to send the device identifier to the positioning server.

A specific connection relationship is: the processor 1402 is connected to the transceiver 1401.

The terminal provided in this embodiment and the positioning method in Embodiment 3 are two aspects based on a same inventive concept, an implementation process of the method is already described above in detail, so that a person skilled in the art can clearly learn a device structure and the implementation process in this embodiment according to the description above, and for brevity of the specification, details are not described herein again.

Embodiment 8

Based on a same inventive concept, this application further provides an active signal device.

Figure 15:
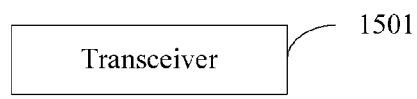
FIG. 15 is a schematic structural diagram of an active signal device according to an embodiment of the present disclosure.

As shown in FIG. 15, the active signal device includes: a transceiver 1501 configured to obtain geomagnetic information of a location of an active signal device and a device identifier of the active signal device; and broadcast the geomagnetic information and the device identifier.

The terminal provided in this embodiment and the positioning method in Embodiment 4 are two aspects based on a same inventive concept, an implementation process of the method is already described above in detail, so that a person skilled in the art can clearly learn a device structure and the implementation process in this embodiment according to the description above, and for brevity of the specification, details are not described herein again.

Embodiment 9

In this embodiment, a communication method is provided.

Figure 16:
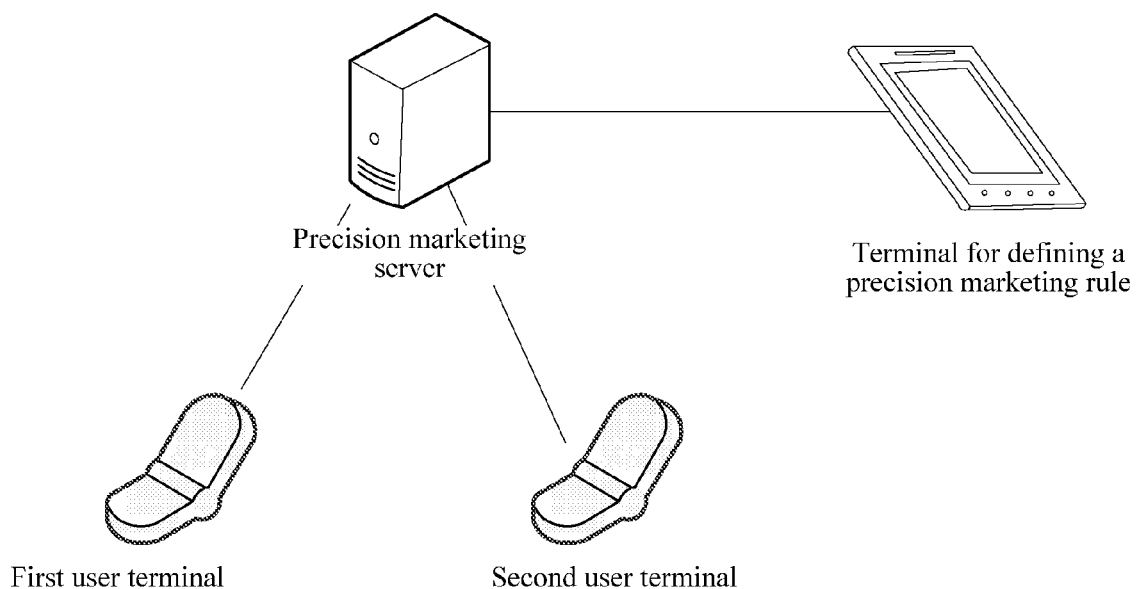
FIG. 16 is a schematic diagram of a system corresponding to a communication method according to an embodiment of the present disclosure.

Before this embodiment is introduced, a system corresponding to the communication method in this embodiment is introduced first. As shown in FIG. 16, FIG. 16 shows a system used to implement the communication method provided in this embodiment, and the system includes: a precision marketing server, a terminal for defining a precision marketing rule, and at least one user terminal.

Figure 17:
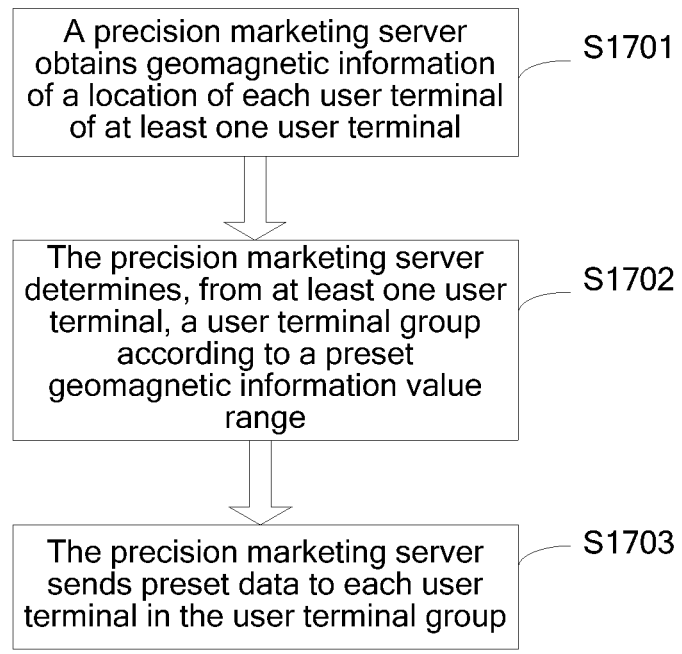
FIG. 17 is a flowchart of a communication method according to an embodiment of the present disclosure.

As shown in FIG. 17, the positioning method includes:

Step S1701: The precision marketing server obtains geomagnetic information of a location of each user terminal of the at least one user terminal.

Step S1702: The precision marketing server determines a user terminal group from the at least one user terminal according to a preset geomagnetic information value range, where the geomagnetic information of the location of each user terminal in the user terminal group meets the geomagnetic information value range.

Step S1703: The precision marketing server sends preset data to each user terminal in the user terminal group.

In a specific implementation process, the user terminal may be a terminal such as a mobile phone, a tablet computer, or a smart watch, which is not limited in this embodiment.

The method provided in this embodiment is described below:

First, step S1701 of obtaining, by the precision marketing server, geomagnetic information of a location of each user terminal of the at least one user terminal is performed.

Specifically, the geomagnetic information may include: a component value in an X direction parallel to a horizontal plane, a component value in a Y direction parallel to the horizontal plane, and a vertical component value in a Z direction perpendicular to the horizontal plane, where the component value in the X direction represents a geomagnetic strength in the X direction, the component value in the Y direction represents a geomagnetic strength in the Y direction, and the vertical component value represents a geomagnetic strength in a Z direction.

For example, the geomagnetic information may be {x, y, z}, where x is the component value in the X direction, y is the component value in the Y direction, and z is the vertical component value.

Next, step S1702 is performed, that is, the precision marketing server determines a user terminal group from the at least one user terminal according to a preset geomagnetic information value range, where the geomagnetic information of the location of each user terminal in the user terminal group meets the geomagnetic information value range.

In a specific implementation process, the preset geomagnetic information value range may be sent in advance by the terminal for defining a precision marketing rule in the system shown in FIG. 16 to the precision marketing server.

Specifically, the geomagnetic information value range may include: a value range of the component value in the X direction, a value range of the component value in the Y direction, and a value range of the vertical component value in the geomagnetic information. The component value in the X direction, the component value in the Y direction, and the vertical component value of each user terminal in the user terminal group all meet corresponding value range requirements.

Finally, step S1703 of sending, by the precision marketing server, preset data to each user terminal in the user terminal group is performed.

In a specific implementation process, the preset data may be sent in advance by the terminal for defining a precision marketing rule in the system shown in FIG. 16 to the precision marketing server.

Embodiment 10

Based on a same inventive concept, this application further provides a precision marketing server.

Figure 18:
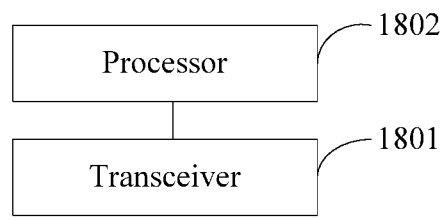
FIG. 18 is a schematic structural diagram of a precision marketing server according to an embodiment of the present disclosure.

As shown in FIG. 18, the precision marketing server includes: a transceiver 1801 configured to receive geomagnetic information of a location of each user terminal of at least one user terminal; and send the geomagnetic information to a processor 1802; and the processor 1802 configured to determine a user terminal group from the at least one user terminal according to a preset geomagnetic information value range, where geomagnetic information of a location of each user terminal in the user terminal group meets the geomagnetic information value range; and control the transceiver 1801 to send preset data to each user terminal in the user terminal group.

In a specific implementation process, the user terminal may be a terminal such as a mobile phone, a tablet computer, or a smart watch, which is not limited in this embodiment.

A specific connection relationship is: the processor 1802 is connected to the transceiver 1801.

The precision marketing server provided in this embodiment and the communication method in Embodiment 9 are two aspects based on a same inventive concept, an implementation process of the method is already described above in detail, so that a person skilled in the art can clearly learn a device structure and the implementation process in this embodiment according to the description above, and for brevity of the specification, details are not described herein again.

In several embodiments provided in this application, it should be understood that, the transceiver may be a transceiver unit or a transceiver module, and the processor may be a processing unit or a processing module.

The technical solutions in the embodiments of the present application include at least one technical effect or advantage below:

In this embodiment of the present disclosure, a cell ID is first used to obtain a relatively large positioning range, and then a to-be-positioned terminal and geomagnetic information of a location of a neighboring terminal of the to-be-positioned terminal are used to perform precise positioning, which, on one hand, can overcome a defect that the method for positioning by using an active source signal device such as WiFi and Bluetooth is not stable, thereby improving positioning stability, and on the other hand, overcomes a defect that the method for positioning by using a cell ID has low precision, thereby improving positioning precision. In addition, the to-be-positioned terminal and geomagnetic information of the location of the neighboring terminal of the to-be-positioned terminal are used to perform coordinated positioning, which can avoid a defect of inaccurate positioning when only geomagnetic information is used for positioning, thereby improving positioning accuracy, and implementing a technical effect that positioning stability, precision, and accuracy are achieved simultaneously.

Although some preferred embodiments of the present disclosure have been described, persons skilled in the art can make changes and modifications to these embodiments once they learn the basic inventive concept. Therefore, the following claims are intended to be construed as to cover the exemplary embodiments and all changes and modifications falling within the scope of the present disclosure.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A positioning method implemented by a mobile terminal, the method comprising:
    obtaining a cell identity (ID) of the mobile terminal;
    determining at least one neighboring terminal neighboring the mobile terminal and comprising the cell ID;
    obtaining second geomagnetic information of a second location of each neighboring terminal and first geomagnetic information of a first location of the mobile terminal to generate a geomagnetic information group of the mobile terminal;
    obtaining, according to the geomagnetic information group, geographic location information of the mobile terminal by:
        sending the cell Ill and the geomagnetic information group to a positioning server,
        receiving, from the positioning server, candidate geographic location information corresponding to a matching geomagnetic information group matching the geomagnetic information group, and
        determining the candidate geographic location information as the geographic location information; and
    using the geographic location information in a positioning process.

2. The positioning method of claim 1, wherein obtaining the geographic location information comprises:
    sending the geomagnetic information group to a positioning server; and
    receiving the geographic location information from the positioning server in response to the geomagnetic information group.

3. The positioning method of claim 1, wherein obtaining the geographic location information comprises:
    sending the cell ID to a positioning server;
    receiving from the positioning server a location information set corresponding to the cell ID, wherein the location information set comprises at least one candidate geomagnetic information group and at least one candidate piece of candidate geographic location information corresponding to the at least one candidate geomagnetic information group;
    determining, from the at least one candidate geomagnetic information group, a matching geomagnetic information group matching the geomagnetic information group; and
    determining, from the at least one candidate piece, candidate geographic location information corresponding to the matching geomagnetic information group as the geographic location information.

4. The positioning method of claim 1, wherein determining at least one neighboring terminal comprises:
    determining at least one candidate neighboring terminal comprising the cell ID;
    obtaining second context information of each candidate neighboring terminal and first context information of the mobile terminal; and
    determining, from the at least one candidate neighboring terminal, a candidate neighboring terminal whose second context information matches the first context information, to form the at least one neighboring terminal.

5. The positioning method of claim 4, wherein the first context information and the second context information are at least one of a WiFi identifier, a Bluetooth identifier, or a Global Positioning System (GPS) parameter.

6. The positioning method of claim 1, wherein obtaining the second geomagnetic information and the first geomagnetic information comprises:
    obtaining the second geomagnetic information and the first geomagnetic information to form a pre-geomagnetic information group; and
    determining geomagnetic information from the pre-geomagnetic information group to form the geomagnetic information group,
    wherein a difference between a vertical component value of the geomagnetic information and a vertical component value of the first geomagnetic information is less than a preset threshold.

7. The positioning method of claim 1, wherein after obtaining the geographic location information, the method further comprises:
    obtaining positioning precision of the geographic location information;
    determining whether the positioning precision meets a preset precision requirement;
    displaying a positioning map when the positioning precision does not meet the preset precision requirement;
    detecting an operation that is triggered to determine a positioning point on the positioning map; and
    obtaining, based on the operation, information about a precise geographic location of the positioning point as the geographic location information.

8. An electronic device comprising:
    a processor configured to:
        obtain a cell identity (ID) of a mobile terminal, and
        determine at least one neighboring terminal neighboring the mobile terminal and comprising the cell ID; and
    a transceiver configured to:
        obtain second geomagnetic information of a second location of each neighboring terminal and first geomagnetic information of a first location of the mobile terminal to generate a geomagnetic information group of the mobile terminal, obtain, according to the geomagnetic information group, geographic location information of the mobile terminal, send the cell ID and the geomagnetic information group to a positioning server, and receive, from the positioning server, candidate geographic location information corresponding to a matching geomagnetic information group matching the geomagnetic information group, the processor is further configured to:
determine the candidate geographic location information as the geographic location information, and using the geographic location information in a positioning process.

9. The electronic device of claim 8, wherein the transceiver is further configured to:
obtain the second geomagnetic information and the first geomagnetic information to form a pre-geomagnetic information group; and
send the pre-geomagnetic information group to the processor.

10. The electronic device of claim 9, wherein the processor is further configured to:
receive the pre-geomagnetic information group from the transceiver; and
determine geomagnetic information from the pre-geomagnetic information group to form the geomagnetic information group,
wherein a difference between a vertical component value of the geomagnetic information and a vertical component value of the first geomagnetic information is less than a preset threshold.

11. The electronic device of claim 8, wherein the processor is further configured to:
obtain positioning precision of the geographic location information;
determine whether the positioning precision meets a preset precision requirement;
control displaying of a positioning map when the positioning precision does not meet the preset precision requirement;
detect an operation that is triggered to determine a positioning point on the positioning map; and
obtain, based on the operation, information about a precise geographic location of the positioning point as the geographic location information.

12. The electronic device of claim 8, wherein the transceiver is further configured to receive from the positioning server a location information set corresponding to the cell ID, wherein the location information set comprises at least one candidate geomagnetic information group and at least one candidate piece of candidate geographic location information corresponding to the at least one candidate geomagnetic information group.

13. The electronic device of claim 12, wherein the processor is further configured to:
determine, from the at least one candidate geomagnetic information group, a matching geomagnetic information group matching the geomagnetic information group; and
determine, from the at least one candidate piece, candidate geographic location information corresponding to the matching geomagnetic information group as the geographic location information.

14. The electronic device of claim 8, wherein the processor is further configured to:
determine at least one candidate neighboring terminal comprising the cell ID;
obtain second context information of each candidate neighboring terminal and first context information of the mobile terminal; and
determine, from the at least one candidate neighboring terminal, a candidate neighboring terminal whose second context information matches the first context information to form the at least one neighboring terminal.

15. The electronic device of claim 14, wherein the first context information and the second context information are at least one of a WiFi identifier, a Bluetooth identifier, or a Global Positioning System (GPS) parameter.

* * * * *

UNITED STATES PATENT AND TRADEMARK OFFICE
CERTIFICATE OF CORRECTION

Page 1 of 1

PATENT NO. : 9,913,243 B2
APPLICATION NO. : 15/463014
DATED : March 6, 2018
INVENTOR(S) : Qingwei Zhao and Qifeng Ma It is certified that error appears in the above-identified patent and that said Letters Patent is hereby corrected as shown below:

Column 27; Line 45; Claim 1 should read:
sending the cell ID and the geomagnetic information Signed and Sealed this
Twenty-fourth Day of April, 2018

Andrei Iancu
*Director of the United States Patent and Trademark Office*